United States Patent [19]

Harper-Tervet et al.

[11] 4,351,878

[45] Sep. 28, 1982

[54] COATING FOR GASIFIABLE CARBON-GRAPHITE FIBERS

[75] Inventors: Jan Harper-Tervet, Palmdale; Warren L. Dowler, Sierra Madre; Shiao-Ping S. Yen, Altadena; William A. Mueller, Glendale, all of Calif.

[73] Assignee: The United States of America as represented by the Administrator of the National Aeronautics & Space Administration, Washington, D.C.

[21] Appl. No.: 164,585

[22] Filed: Jun. 30, 1980

[51] Int. Cl.³ .............................................. B32B 19/02
[52] U.S. Cl. .................................. 428/367; 427/215; 427/241; 428/375; 428/392; 428/902; 428/903
[58] Field of Search ............... 428/367, 902, 903, 375, 428/392; 252/506, 508, 509, 511, 500; 427/197, 113, 114, 226, 212, 215, 301, 341, 343; 260/29.1 R, 29.4 R, 29.2 M, 29.2 R, 38, 37 EP, 37 N, 37 SB, 40 R

[56] References Cited

U.S. PATENT DOCUMENTS

| | | | |
|---|---|---|---|
| 4,064,074 | 12/1977 | Ellis | 252/511 X |
| 4,119,572 | 10/1978 | Fridman et al. | 427/114 X |
| 4,177,318 | 12/1979 | Williams | 428/408 |
| 4,214,037 | 7/1980 | Galasso et al. | 428/367 |

Primary Examiner—Norman Morgenstern
Assistant Examiner—Thurman K. Page
Attorney, Agent, or Firm—Paul F. McCaul; John R. Manning; Thomas H. Jones

[57] ABSTRACT

A thin, uniform, firmly adherent coating of metal gasification catalyst is applied to a carbon-graphite fiber by first coating the fiber with a film-forming polymer containing functional moieties capable of reaction with the catalytic metal ions. Multivalent metal cations such as calcium cross-link the polymer such as a polyacrylic acid to insolubilize the film by forming catalytic metal macro-salt links between adjacent polymer chains. The coated fibers are used as reinforcement for resin composites and will gasify upon combustion without evolving conductive airborne fragments.

13 Claims, No Drawings

COATING FOR GASIFIABLE CARBON-GRAPHITE FIBERS

DESCRIPTION

Origin of the Invention

The invention described herein was made in the performance of work under a NASA contract and is subject to the provisions of Section 305 of the National Aeronautics and Space Act of 1958, Public Law 83-568 (72 Stat. 435; 42 USC 2457).

TECHNICAL FIELD

The present invention relates to coated carbon-graphite fibers and, more particularly, to such fibers containing a catalytic coating capable of combustion of such fibers in a burning composite.

BACKGROUND ART

Considerable interest exists in the future use of carbon-graphite fibers due to their light weight and high strength. Presently, about 30 pounds of graphite are being utilized per plane in manufacture of several existing aircraft and future projected use is 1000 lbs/aircraft. Due to the need to reduce weight of automobiles to increase fuel efficiency, use in cars is also expected to increase dramatically over the next decade. The projected annual use of graphite fibers by 1990 is as follows:

TABLE 1

| Industry | Pounds |
| --- | --- |
| Aerospace | $10^6$ |
| Automobile | $10^9$ |
| Consumer | $10^6$ |

Commercial carbon fiber is usually sold as a stranded material or as a woven cloth, having from 100 to 10,000 discrete thin fibers per strand. These fibers are prepared by heating a precursor such as rayon, pitch or polyacrylonitrile fiber to carbonize the fibers followed by a high temperature (2000°–3000° C.) graphitization treatment under stress in absence of oxygen during which it is believed that the carbon atoms rearrange into a hexagonal structure. The industry has developed fine strand multifilament products as the result of difficulties in manufacturing large diameter fiber of sufficiently high modulus. It will be noted that an extremely small fiber diameter is now the industry standard, and is not predicted to change very much in the immediate future:

| | |
| --- | --- |
| Carbon Fiber Diameter | 6.5 to 13 microns |
| Modulus | 50 million psi |
| Fall Rate in air at 1 ATM | about 2 cm/sec. |
| Resistivity | 1000 ohms/cm. |
| Burnout | 0.5 to 1.0 watt/cm. |
| Contact Voltage Drop | 2 to 5 volts |

Recently a significant hazard has been recognized that could prevent the widespread use of graphite fibers. The fine fibers are conductive and are not oxidized nor vaporized at the temperatures experienced during a typical fire. During a fire the epoxy or other resin binder is destroyed at 400°–600° C. Fine graphite fibers and fragments are expelled from the composite, are entrained in the air and form aerosols. The aerosols can travel significant distances, invade or settle in unprotected electrical or electronic equipment and cause shorting, equipment failure, power failure and blackouts. Automobile fires are quite a common event and aircraft fires occur frequently. Such an event could cause disastrous consequences at or near airport, industrial or residential areas.

Since the surface temperature of combustion (fast oxidation) of graphite is in the vicinity of 1300° C., fast oxidation of graphite is hardly reached by the simple combustion of a composite panel which occurs at typical surface temperature of 400–500 degrees C. Also, even if the requisite temperatures are reached, the rates of combustion (oxidation) are too low compared to the same rates for the resin. This has the practical implication that the resin burns away fast leaving behind the graphite fibers that do not combust in the absence of the supporting flame. The fiber diameter of 8 microns presents a 2500 $cm^2$ surface area per gram of mass. This is very large and leads to rapid heat loss and is conducive to early extinction even if the combustion is initiated.

An additional property of the carbon fiber is the "red heat" behavior. It should be emphasized that in a shorting situation a single carbon fiber is most difficult to burn or consume. Rather the literature suggests that the carbon fiber becomes a glowing filament and does not pyrolyze or burn at least to about 2300° K. And even above that temperature adequate air circulation is required to consume the fiber fully. A minimum of 16 grams of oxygen are needed to consume 12 grams of carbon, and hence in a closed area such as in the chassis of an electronic system, lack of air circulation and sufficiently high voltages may cause the fibers to develop a "red heat" condition and ignite adjacent flammable plastics and the like.

In order to permit such widespread use of graphite composites, the recognized electrical hazards must be overcome economically without sacrificing or compromising the proven good features (strength, weight and cost). This should preferably be achieved so that the fiber and composite are compatible with state of the art processing and equipment. Furthermore, modification of the fiber by coating or treatment must provide a good bond to the fiber and to the resin matrix.

One approach to solving this problem is disclosed in a prior patent application entitled Gasifiable Carbon-Graphite Fibers filed on Apr. 17, 1979 by Marshall F. Humphrey, Kumar N. R. Ramohalli and Warren L. Dowler under Ser. No. 030,836, the disclosure of which is expressly incorporated herein by reference.

This copending application discloses the coating of carbon-graphite fibers with a salt of a metal having a work function below 4.2 eV such as an alkaline earth metal salt. The coating catalytically enhances combustion of the fibers at temperatures below 1000° C. such that the fibers self-support combustion and burn to produce a non-conductive ash even in the absence of an external flame. It is important that the coating of the metal salt be applied uniformly and economically to the graphite.

Ion plating and electrodeposition will provide a uniform coating of metal salt, but are costly and time consuming. Application of the coating by immersion in a solution of a salt followed by drying results in a non-uniform, clumpy coating, which was difficult to control, was not esthetically pleasing and caused non-uniform burning of the fibers.

STATEMENT OF THE INVENTION

The present invention discloses a method of easily and economically applying a coating of gasification catalyst to graphite fibers which provides a thin, uniform, firmly adhering coating which optimizes the catalytic effect of the metal salt during graphite fiber combustion and is expected to provide better compatibility with the matrix resin when fabricated into a composite. The coating is formed of a cross-linked, film forming polymer having good wettability for the carbon-graphite fiber and containing functional moieties along or pendant from the polymer backbone capable of reaction with monovalent and multivalent catalytic cations. The cross-linked polymer should be insoluble in and physically compatible with the matrix binder resin and may additionally contain functional groups reactive with the matrix resin. After application of a thin even layer of the polymer to the fibers, the catalyst metal is applied to the layer and reacts therewith to insolubilize the layer by forming catalytic metal macrosalt cross-links between adjacent molecular polymer chains. A thin, even coating of catalyst results which is uniform in appearance, forms high strength composites and burns evenly in a fire situation.

The mechanical properties of the fibers and of the composite are not detrimentally affected by the presence of the coating. The coating is present in an amount of 0.1 to 10% by weight which does not entail a significant weight penalty. The coating is compatible with binder resins and its presence does not require modification of state-of-the-art fiber and composite processing techniques nor fabrication equipment. This will facilitate quick transfer of the technology to industrial practice.

These and many other features and attendant advantages of the invention will become readily apparent as the invention becomes better understood by reference to the following detailed description.

DETAILED DESCRIPTION OF THE INVENTION

The fibers are carbon-graphite monofilaments containing from at least 10% graphite up to 100% graphite. The graphite forms an electrically conductive exterior surface on the fibers. The graphite fibers have a diameter of at least 1 micron. Fibers having diameter above 30 microns are too heavy to entrain in air and, therefore, do not form aerosols. The fibers are usually provided as a multifilament yarn containing 100 to 10,000, preferably 100 to 3000 filaments per strand and can be woven into cloth.

The catalysts utilizable in this invention are salts of electronegative metals having a work function less than 4.2 eV. The metals can be selected from Groups I to VIII of the Periodic Table. However, the most cost effective catalysts are the alkaline earth metals, particularly barium, calcium, strontium and magnesium. The anions can be inorganic, organic, or polymeric anions. Typical anions are carbonate, nitrate, hydroxyl, sulfate or salts of organic acids containing from 2 to 20 carbon atoms such as acetates, gluconates, acrylates, tartrates, acetoacetonates or mixtures thereof, or polyanions containing carboxylate groups.

The catalytic metal is present in an amount from at least 0.05% to provide significant catalytic combustion enhancement and cross-linking. Amounts above 20% by weight add too much weight penalty to the fiber. Generally, effective gasification can be achieved with from 0.1 to 5% by weight of the catalyst. It has further been discovered that the rate of gasification is further enhanced by adding from 0.1 to 20% by weight of the catalyst to the binder resin which forms part of the composite.

The film forming resin is a linear organic uncrosslinked polymer containing an anion function capable of forming a salt with the catalytic cation. Suitable functional groups are carboxyl, sulfonic or phosphonic. The polymer backbone may be aliphatic or aromatic. Preferred polymers that readily wets the carbon-graphite fibers and contains carboxyl functionality are polymers of acrylic acid. Liquid polymers having a molecular weight from 5,000 to 100,000 are suitable, preferably from 10,000 to 50,000. The polymer may be a homopolymer or a copolymer with 10 to 70% by weight other addition copolymerizable olefinic monomers such as acrylic esters for example methyl acrylate, methyl methacrylate or ethyl acrylate. The polymer may contain functional groups other than carboxyl capable of reaction with epoxy groups or other functional groups of the matrix resin such as amines.

The polymer layer can be applied to the fiber from bulk, solution, or dispersion. For reasons of economics and ease and uniformity of application, the polymer is preferably applied to the fiber from aqueous solution followed by evaporation of water to deposit a thin even layer of polymer on the fiber. The solution can be a dilute solution containing 5 to 30% by weight of polymer solids. The solution can be applied by immersion, spraying or brushing the solution onto the fiber whether in monofilament, multifilament, strand or woven cloth form. The solution should penetrate wet and coat each individual monofilament. The polymer film need not be applied directly to the surface of the fiber but may be applied to the typical sizing coating such as polyvinyl alcohol or epoxy resin.

The catalytic metal is preferably applied to the polymer coated fibers at elevated temperature, suitably by immersion in a boiling solution of catalytic metal salt in order to increase the rate and extent of cross-linking and binding of catalytic metal to the fibers. The cross-link density to render the polymer insoluble need not be that high. Two or more cross-links per polymer chain is probably sufficient. The remainder of the catalytic metal can be present on the fiber as a mixed salt of the polymer anion and the catalytic salt anion such as acetate. The boiling procedure provides about 50% cross-linking of available polymeric anion groups.

The composites usually contain from 30% up to 70% of graphite fiber reinforcement, typically from 40% to 60% graphite fibers dispersed in the matrix resin. Various resins can be utilized such as epoxy resins, polyesters, phenolics, silicones or polyimides. The most widely used and qualified resins are Bisphenol A epoxy resins cured with from 10 to 30% of diamine curing agent hardeners.

Examples of practice follow:

EXAMPLE 1

A sample of woven carbon-graphite fibers was weighed and then soaked in poly-acrylic acid (Goodrite K-702, 20% soln. in $H_2O$). The sample was then blotted and dried at approximately 120° C. for two or more hours. The fiber was reweighed to determine the weight of the acrylate on the fiber. The acrylate treated fiber was then reacted with boiling calcium acetate (any suitable metallic ion in solution will do). Any divalent metallic ion, in this case calcium, will cross-link the chains of the acrylate polymer, forming an insoluble catalyst polymer film on the fibers. The fiber was removed from the solution, blotted and dried at approximately 120° C. The sample was then washed with distilled water to remove any calcium that was not strongly bonded and then it was redried. The fiber was weighed after drying to determine the weight of calcium that was bonded to the acrylate. The average weight gain due to the calcium acrylate film was about five to six percent.

The catalytic coated fibers of this invention demonstrate self-sustained fiber gasification to a nonconductive ash. The new catalytic coating involves a small cost and only increases the weight penalty slightly over the prior metal salt coatings. The new coating provides significant improvement in the alleviation of short circuits in burned graphite composites due to its formation of a thin even coating.

EXAMPLE 2

A 2.22482 g sample of woven carbon-graphite fibers was soaked in 10% aqueous poly-acrylic acid solution (Goodrite K-702). The sample was then blotted and dried for 2½ hours at about 110 degrees C. and reweighed to determine that 0.2187 poly-acrylic acid had deposited on the fibers. The acrylate treated fiber was then reacted with a 20% solution by weight of calcium acetate, removed from the solution, blotted and dried for approximately 20 minutes at about 110 degrees C. The amount of calcium added to the fiber before washing was 0.40213 g which includes both calcium that is present on the fibers by crossing-linking polymer chains of the acrylate and any excess calcium acetate that is not cross-linked. The excess calcium acetate can be removed by washing the coated fibers with distilled water to remove the unbonded calcium acetate.

EXAMPLE 3

Example 2 was repeated utilizing 2.63705 g of fiber. The amount of poly-acrylic acid added to the fiber was 0.02407 g and the weight of calcium acetate added to the fiber was 0.4006 g.

The coated cross-link samples of Examples 2 and 3 burned fairly well.

Therefore, it was decided to determine whether the fibers could be made to gasify even more completely if a higher weight of calcium was deposited.

EXAMPLE 4

A 2.43129 g sample of woven carbon-graphite fiber was soaked in 20% Goodrite K-702 aqueous poly-acrylic acid solution, blotted and dried for 2 hours at about 115 degrees C. The amount of poly-acrylic acid on the fibers was determined to be 0.09809 g. The acrylate treated fiber was then reacted with boiling calcium acetate (20% solution by weight), removed from the solution, blotted and then dried for about 20 minutes at 115 degrees C. The amount of calcium added to the fiber was 0.3055 g before washing and 0.07003 g after washing. The coating appeared fairly consistent and sample strand burns very well in a flame, only a few fragments flying off.

EXAMPLE 5

A sample of 2.9314 g woven carbon-graphite fiber was soaked in 20% Goodrite K-702 aqueous polyacrylate solution, blotted and dried for 2 hours at 115 degrees C. The amount of polyacrylic acid on the fibers was 0.10534 g. The polyacrylate coated fibers were reacted with a 20% solution by weight of boiling calcium acetate and then dried at 115 degrees C. for 20 minutes. The weight of calcium acetate on the fiber after washing with distilled water and redrying was 0.10047 g. The sample strand burned about the same as Example 4.

EXAMPLE 6

A sample of 1.76542 g of woven carbon-graphite fiber was soaked in 10% aqueous solution of Goodrite K-732, blotted and dried at about 125 degrees C. for 2.5 hours. The amount of poly-acrylic acid on the fibers was 0.05602 g. The polyacrylate coated fibers were reacted with a 20% solution by weight of boiling calcium acetate, and dried at 125 degrees C. for 20 minutes. The weight of calcium on the fibers after washing, redrying was 0.05412 g. A sample strand burns fairly well in a flame, but not completely evenly. There were many more fragments flying off than samples coated with Goodrite K-702. There appears to be areas that are not well coated with calcium. Goodrite K-732 has a molecular weight of 5,000 whereas Goodrite K-702 has a molecular weight of 90,000. Furthermore, the viscosity of K-732 is much lower than that of K-702 and, therefore, may not flow on and remain on the fibers Therefore, it is preferred that the poly-acrylic acid have a molecular weight of at least 25,000.

EXAMPLE 7

A sample of 1.73505 g of woven carbon-graphite fiber was soaked in 10% aqueous Goodrite K-732, blotted and dried for 2.5 hours at 125 degrees C. The amount of acid on the fibers was determined to be 0.04778 g. The poly-acrylic acid coated fibers were reacted with boiling calcium acetate (20% solution by weight) and then dried for 20 minutes at 125 degrees C. The amount of calcium on the fibers after washing and drying was determined to be 0.03704 g. The sample burns the same as Example 6.

EXAMPLE 8

Example 7 was repeated utilizing boiling poly-acrylic acid. This caused the woven fibers to come apart and the individual filaments making up each strand also tended to split apart.

EXAMPLE 9

A sample of 1.94843 g of woven carbon-graphite fiber was soaked in 20% aqueous Goodrite K-732, blotted and dried for 2 hours at about 125 degrees C. The amount of poly-acrylic acid on the fibers was determined to be 0.13494 g. The poly-acrylic acid coated fiber was reacted with boiling calcium acetate (20% solution by weight) and then dried for about ½ hour at 120 degrees C. The weight of calcium on the fibers after washing and drying was 0.02347 g. A sample strand containing this very low amount of calcium did not burn well, but flamed.

EXAMPLE 10

A sample of 1.61758 g of woven carbon-graphite fiber was soaked in a 20% aqueous Goodrite K-732 solution, blotted and dried for 2 hours at about 125 degrees C. The amount of poly-acrylic acid on the fibers was determined to be 0.09867 g. The poly-acrylic acid coated fibers were reacted with boiling calcium acetate (20% solution by weight) and then dried at 120 degrees C. for ½ hour. The weight of calcium on the fibers after washing and drying was determined to be 0.06419 g. A sample strand burned in a flame much better than Examples 6, 7 and 9.

EXAMPLE 11

A sample of 1.61913 g of woven carbon-graphite fiber was soaked in 20% aqueous solution of Goodrite K-702, blotted and dried for 3.5 hours at about 120 degrees C. The amount of acid on the fibers was determined to be 0.05006 g. The poly-acrylic acid fibers were reacted with boiling calcium acetate (10% solution by weight) blotted and dried for 20 minutes at 120 degrees C. The weight of calcium on the fibers after washing and drying was 0.03651 g. A sample strand burned in a flame did not gasify completely, large fragments of the fiber flew off.

EXAMPLE 12

A sample of 1.40303 g of woven carbon-graphite fiber was soaked in 20% aqueous Goodrite K-702 solution, blotted and then dried at about 120 degrees C. for 3½ hours. The amount of poly-acrylic acid on the fiber was determined to be 0.03839 g. The poly-acrylic acid coated fiber was reacted with boiling calcium acetate (10% solution by weight) blotted and then dried for 20 minutes at 115 degrees C. The weight of calcium acetate remaining on the fiber after washing and drying was 0.03729 g. A sample strand burn in a flame gasified almost completely with very few fragments flying off.

EXAMPLE 13

A sample of 2.99318 g of woven carbon-graphite fiber was soaked in 20% aqueous Goodrite K-702 solution, blotted and then dried for 3½ hours at 45 degrees C. The amount of poly-acrylic acid on the fiber after drying was determined to be 0.07641 g. The poly-acrylic acid coated fiber was reacted with boiling calcium acetate (20% solution in water), blotted and then dried for 20 minutes at 115 degrees C. The weight of calcium acetate remaining on the fiber after washing and redrying was 0.03771 g. A sample strand burned in a flame gasified almost completely with very few fragments flying off.

EXAMPLE 14

A sample of 1.94556 g of woven carbon-graphite fiber was coated with 0.46751 g of Goodrite K-702 polyacrylic acid, and then reacted with a 10% aqueous solution containing 25% of lithium acetate and 25% of calcium acetate, blotted, dried and determined that 0.08661 grams of lithium-calcium acetates have been added to the fiber. The fiber appeared to be lighter and less rigid than those treated with a pure calcium acetate solution. The fibers appeared to be held together better by the lithium-calcium mixture. A sample of the fiber burned evenly and appeared to gasify fairly completely. The lithium appears to hold the filaments in place until the calcium can gasify the fiber.

EXAMPLE 15

A sample of 2.43534 g of woven carbon-graphite fiber was coated with 0.04613 g of poly-acrylic acid and then treated with an aqueous 5% boiling solution of an equal weight mixture of lithium and calcium acetates to deposit 0.0745 grams of the mixture on the fibers.

EXAMPLE 16

The procedure of Example 15 was repeated with a 2.07777 g sample of carbon-graphite fiber containing 0.04285 g of poly-acrylic acid. The coated fiber was dipped into a boiling 50% solution of an equal mixture of lithium and calcium acetates to deposit 0.02987 g weight of the mixed acetates on the fiber.

EXAMPLE 17

A sample of 2.64039 g of carbon-graphite fiber containing 0.05882 g of poly-acrylic acid was treated with a 50/50 mixture of boiling lithium/calcium acetate mixture in a 10% solution to deposit 0.11550 g of the mixed acetates on the fiber. Each of the burned samples of Examples 15, 16 and 17 were more flexible than that of Example 14 and burned evenly and substantially completely in a flame.

EXAMPLE 18

A sample of carbon-graphite fiber containing about 2% by weight of poly-acrylic acid was treated with a 10% boiling solution of a mixture of lithium calcium acetates in a ratio of 75/25 lithium/calcium. A sample of the fiber was very flexible, evenly coated and held together very well and burned completely in a flame.

It is to be realized that any preferred embodiments of the invention have been described and that numerous substitutions, alterations and modifications are all permissible without departing from the spirit and scope of the invention as defined in the following claims.

What is claimed is:

1. A composition of matter comprising:
   graphite fibers having a diameter from 1 to 30 microns directly coated with 0.1 to 10% by weight of a thin, uniform, firmly adherent, film of a linear organic polymer containing anion groups selected from sulfonic, carboxyl or phosphonic which are cross-linked by cations of a polyvalent metal having a work function below 4.2 eV to form macrosalt cross-links with said groups on adjacent polymer chains; said metal being present in an amount of 0.05 to 20% by weight; and
   said coated fibers being dispersed and embedded in a binder resin in an amount of 30 to 70% by weight.

2. A composition according to claim 1 in which the fibers are in the form of a multifilament yarn.

3. A composition according to claim 1 in which the binder resin is selected from epoxy, polyester, phenolic, silicone, polyimide, triazine or phthalocyanine resins.

4. A composition according to claim 3 in which the resin is an epoxy.

5. A composition according to claim 3 in which the coating material is a poly-acrylic acid and the cross-linking metal is an alkaline earth metal.

6. A composition according to claim 3 in which the coating material is a polyacrylic acid containing both divalent and monovalent cations.

7. A composition according to claim 6 in which the divalent metal is selected from calcium, barium and strontium.

8. A composition according to claim 7 in which the divalent metal is calcium and the monovalent metal is lithium.

9. A composition according to claim 1 further including 0.1 to 10% by weight of the metal cation dispersed in the binder resin.

10. A method of forming a gasifiable fiber comprising the steps of:
applying a 0.1 to 10% by weight of a thin, uniform, firmly adherent layer of a linear, organic polymer containing anion groups capable of cross-linking with multivalent metal cations selected from carboxyl, sulfonic and phosphonic directly to the exterior surface of a fine graphite fiber having a diameter from 1.0 to 30 microns; and
applying a solution containing cations of a polyvalent metal gasification catalyst having a work function below 4.2 eV and reacting the metal cations with said anion groups on adjacent polymer chains to form macrosalt cross-links which insolubilize said layer to form an insoluble coating on the fiber.

11. A method according to claim 10 in which the polymer is applied to the fiber from a solution and further including the steps of drying the solution to form a polymer layer followed by reacting the polymer layer with said metal to crosslink said polymer to form an insoluble coating on the fiber.

12. A method according to claim 11 further including the step of dispersing the coated fibers in a binder resin and curing the resin to form a composite.

13. A method according to claim 11 in which the polymer is a polyacrylic acid and the metal is calcium.

* * * * *